US009236900B2

(12) United States Patent
Iwai et al.

(10) Patent No.: US 9,236,900 B2
(45) Date of Patent: Jan. 12, 2016

(54) RADIO TRANSMISSION APPARATUS AND RADIO TRANSMISSION METHOD

(71) Applicant: PANASONIC INTELLECTUAL PROPERTY CORPORATION OF AMERICA, Torrance, CA (US)

(72) Inventors: Takashi Iwai, Miyagi (JP); Daichi Imamura, Osaka (JP); Sadaki Futagi, Miyagi (JP); Yoshihiko Ogawa, Osaka (JP); Tomofumi Takata, Miyagi (JP); Atsushi Matsumoto, Miyagi (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 13/685,437

(22) Filed: Nov. 26, 2012

(65) Prior Publication Data

US 2013/0077656 A1 Mar. 28, 2013

Related U.S. Application Data

(63) Continuation of application No. 12/531,247, filed as application No. PCT/JP2008/000588 on Mar. 14, 2008, now Pat. No. 8,340,154.

(30) Foreign Application Priority Data

Mar. 15, 2007 (JP) ................................. 2007-067004

(51) Int. Cl.
*H04B 1/692* (2011.01)
*H04J 13/00* (2011.01)
*H04J 13/14* (2011.01)

(52) U.S. Cl.
CPC ............ *H04B 1/692* (2013.01); *H04J 13/0074* (2013.01); *H04J 13/0048* (2013.01); *H04J 13/0059* (2013.01); *H04J 13/0062* (2013.01); *H04J 13/14* (2013.01)

(58) Field of Classification Search
CPC .............. H04J 13/0062; H04J 13/0074; H04J 13/0048; H04J 13/0059
USPC ................... 375/130, 132, 135, 138, 260, 295
See application file for complete search history.

(56) References Cited

U.S. PATENT DOCUMENTS 7,072,324 B1 * 7/2006 Kim et al. ...................... 370/342
7,313,164 B1 12/2007 Wilson
(Continued)

FOREIGN PATENT DOCUMENTS

EP 2 037 601 3/2009
JP 2005-303765 10/2005
(Continued)

OTHER PUBLICATIONS

3GPP TSG RAN WG1 Meeting #48, Rt-070935, "Uplink reference signal hopping comparison," Panasonic, NTT DoCoMo, Feb. 2007, 15 pages total.*
3GPP TSG RAN WG1 Meeting #48, R1-071109, Huawei, "Sequence Allocation Method for E-UTRA Uplink Reference Signal"). Feb. 16, 2007.*
International Search Report dated Apr. 15, 2008.
3GPP TSG RAN WG1 Meeting #48, R1-070935, "Uplink reference signal hopping comparison," Panasonic, NTT DoCoMo, Feb. 2007, 15 pages total.
(Continued)

*Primary Examiner* — Shuwang Liu
*Assistant Examiner* — Ross Varndell
(74) *Attorney, Agent, or Firm* — Dickinson Wright PLLC

(57) ABSTRACT

Disclosed are a radio transmission device and a radio transmission method which can reduce a processing amount or a memory amount while maintaining the randomizing effect of other cell interference. When using as a reference signal, a ZC sequence of the sequence length uniquely correlated to a transmission bandwidth of a reference signal, as the transmission bandwidth becomes smaller and the sequence length of the ZC sequence becomes shorter, the sequence is switched at a shorter time interval and as the transmission bandwidth becomes greater and the sequence length of the ZC sequence becomes longer, the switching is performed at a longer time interval. Thus, a reference signal is generated by using the ZC sequence in accordance with the timing into which the reference signal transmission bandwidth and the sequence are switched.

11 Claims, 8 Drawing Sheets

(56) References Cited

U.S. PATENT DOCUMENTS

2007/0230600 A1* 10/2007 Bertrand et al. ............. 375/260
2008/0139237 A1*  6/2008 Papasakellariou ............ 455/522
2010/0111142 A1   5/2010 Iwai
2013/0077656 A1   3/2013 Iwai

FOREIGN PATENT DOCUMENTS

| JP | 2008-028977 | 2/2008 |
| JP | 5078989 | 9/2012 |

OTHER PUBLICATIONS

M. Jamil, et al., "A comparison of unfiltered and filtered complex spreading sequences based on aperiodic correlation properties," Spread Spectrum Techniques and Applications, 1998, Proceedings, 1998 IEEE 5th International Symposium on, Sep. 1998, chapter 1.1, pp. 686-691.

3GPP TSG RAN WG1 Meeting #48, R1-071109, "Sequence Allocation Method for E-UTRA Uplink Reference Signal," Huawei, Feb. 12-16, 2007, 3 pages total.

* cited by examiner

RADIO TRANSMISSION APPARATUS AND RADIO TRANSMISSION METHOD

CROSS REFERENCE TO RELATED APPLICATIONS

This is a continuation application of application Ser. No. 12/531,247 filed Sep. 14, 2009, which is a national stage of PCT/JP2008/000588 filed Mar. 14, 2008, which is based on Japanese Application No. 2007-067004 filed Mar. 15, 2007, the entire contents of each of which are incorporated by reference herein.

TECHNICAL FIELD

The present invention relates to a radio transmitting apparatus and radio transmission method that sets up a hopping pattern for switching code sequences used as reference signals on a certain time period basis.

BACKGROUND ART

In 3GPP LTE (3rd Generation Partnership Project Long Term Evolution), a Zadoff-Chu sequence (hereinafter "ZC sequence") is adopted as a reference signal (hereinafter "RS") used in uplink. This ZC sequence is a kind of CAZAC sequence (Constant Amplitude and Zero Auto-correlation Code) and represented by following equation 1 or 2.

[1]
$$a_r(k) = \begin{cases} e^{-j\frac{2\pi r}{N}(k^2/2+qk)}, & N:\text{even} \\ e^{-j\frac{2\pi r}{N}(k(k+1)/2+qk)}, & N:\text{odd} \end{cases} \quad \text{(Equation 1)}$$

[2]
$$a_r(k) = \begin{cases} e^{j\frac{2\pi r}{N}(k^2/2+qk)}, & N:\text{even} \\ e^{j\frac{2\pi r}{N}(k(k+1)/2+qk)}, & N:\text{odd} \end{cases} \quad \text{(Equation 2)}$$

Here, N is the sequence length and r is the ZC sequence number, and N and r are coprime integers. Further, q is an arbitrary integer. Reasons to adopt a ZC sequence as an RS include constant frequency response characteristics, good auto-correlation characteristics and low PAPR (Peak to Average Power Ratio).

Further, if the sequence length N of a ZC sequence is a prime number, N−1, a number proportional to N, ZC sequences of good cross-correlation values can be generated. At this time, the cross-correlation value with respect to the signal levels between sequences of the same sequence length (e.g. between different ZC sequence numbers r=1 and r=5) is $1/\sqrt{N}$, and the cross-correlation value decreases when the sequence length N is longer.

Meanwhile, amongst RSs used in uplink, transmitting a reference signal for channel estimation used to demodulate data (hereinafter "DM-RS," which stands for demodulation reference signal) in the same band as the data transmission bandwidth, is adopted in 3GPP LTE. For example, if the data transmission bandwidth is one RB (resource block), the transmission bandwidth of a DM-RS is also one RB, and, if the data transmission bandwidth is two RBs, the transmission bandwidth of a DM-RS is also two RBs. By defining the sequence length N in advance, the transmission bandwidth (the number of RBs) and the sequence length are associated uniquely. For example, N is defined as a prime number to be less than and closest to the number of subcarriers forming an RB. In this case, when one RB is formed with twelve subcarriers, a DM-RS using one RB uses a ZC sequence with a length of which sequence length N is 11, and a DM-RS using two RBs uses a ZC sequence with a length of which sequence length N is 23. In this way, the transmission bandwidth (the number of RBs) and the sequence length are associated uniquely, and the sequence length N of a ZC sequence is longer when the transmission bandwidth (the number of RBs) is wider.

Here, the data transmission bandwidth is determined based on the scheduling of each cell, DM-RSs of different transmission bandwidths are transmitted in the same band between the cells. In this way, when ZC sequences of different transmission bandwidths (different sequence lengths) are multiplexed in the same band, the cross-correlation increases significantly in a certain specific combination of sequence numbers. FIG. 1 shows cross-correlation characteristics obtained by computer simulations. The X axis shows delay (symbols) and the Y axis shows auto-correlation values normalized by signal levels, and the results show the correlations of ZC sequence of N=23 and r=1 to 6 with respect to ZC sequence of N=11 and r=3. As shown in FIG. 1, the correlation value in the combination of N=11 and r=3, and N=23 and r=6 is 0.9 at the maximum, and shows near the signal level, that is, 1.0. The cross-correlation increases about three times as much as the cross-correlation value in the same transmission bandwidth, that is, $1/\sqrt{N}$.

As shown in FIG. 2, if a combination of ZC sequences that increases a cross-correlation (e.g. above-described (r=3 and N=11) and (r=6 and N23)) is allocated to a nearby cell, the influence of interference of a DM-RS from the other cell increases and the accuracy of channel estimation significantly deteriorates, and therefore, demodulation performance deteriorates.

Then, Non-patent Document 1 discloses a ZC sequence hopping method in cellular radio communication systems. Non-patent Document 1 suggests randomizing (i.e. making uniform and equalizing) the interference mobile stations receive from other cells by making sequence numbers of ZC sequences used in DM-RSs a predetermined hopping pattern, and preventing deterioration of modulation performance because of receiving persistently significant interference in one mobile station from other cells.

FIG. 3 shows the hopping example disclosed in Non-Patent Document 1. First, ZC sequences are allocated on a per transmission bandwidth basis (on a per number of RBs basis or sequence length basis) in a predetermined rule, and the allocated ZC sequences are allocated as one sequence group to a cell. Then, by switching the sequence groups at predetermined switching time intervals and a predetermined hopping cycle, interference from other cells is randomized.

FIG. 3 shows that a sequence group in which ZC sequences of certain sequence numbers is formed and that the sequence group is switched at one-slot time intervals and in an M-slots hopping cycle. By this means, numbers of ZC sequences used in each cell are switched with time, it is possible to prevent a certain mobile station from receiving significant interference from other cells persistently and randomize the influence of interference from other cells.

Non-Patent Document 1: Huawei, R1-071109, "Sequence Allocation Method for E-UTRA Uplink Reference Signal," 3GPP TSG RAN WG1Meeting #48, St. Louis, USA, Feb. 12-16, 2007

DISCLOSURE OF INVENTION

Problems to be Solved by the Invention

However, the technique disclosed in the above Non-Patent Document 1, ZC sequences are hopped in all transmission bandwidths (the numbers of RBs or sequence lengths) in the same manner, and, accordingly, the amount of processing and the amount of memory in a mobile station increase when a sequence length (a bandwidth or the number of RBs) is longer. If a sequence length is longer, the number of samples of a ZC sequence increases, and therefore, in a time interval to switch a sequence the amount of processing in the mobile station that is required to generate a new ZC sequence increases. Further, if the mobile station holds all information of ZC sequences to switch by hopping to prevent an increase in the amount of processing, the amount of memory increases.

It is therefore an object of the present invention to provide a radio transmitting apparatus and radio transmission method that reduce the amount of processing or the amount of memory while maintaining the effect of randomizing interference from other cells.

Means for Solving the Problem

The radio transmitting apparatus of the present invention adopts the configuration including: a hopping pattern setting section that sets up a hopping pattern for switching a code sequence to be used as a reference signal per fixed time period, to vary in accordance with a transmission bandwidth of the reference signal; a sequence generating section that generates the code sequence based on the set hopping pattern; and a transmitting section that transmits the generated code sequence.

Advantageous Effects of Invention

According to the present invention, it is possible to reduce the amount of processing or the amount of memory while maintaining the effect of randomizing interference from other cells.

BEST MODE FOR CARRYING OUT THE INVENTION

Now, embodiments of the present invention will be described in detail with reference to the accompanying drawings.

Embodiment 1

Figure 1:
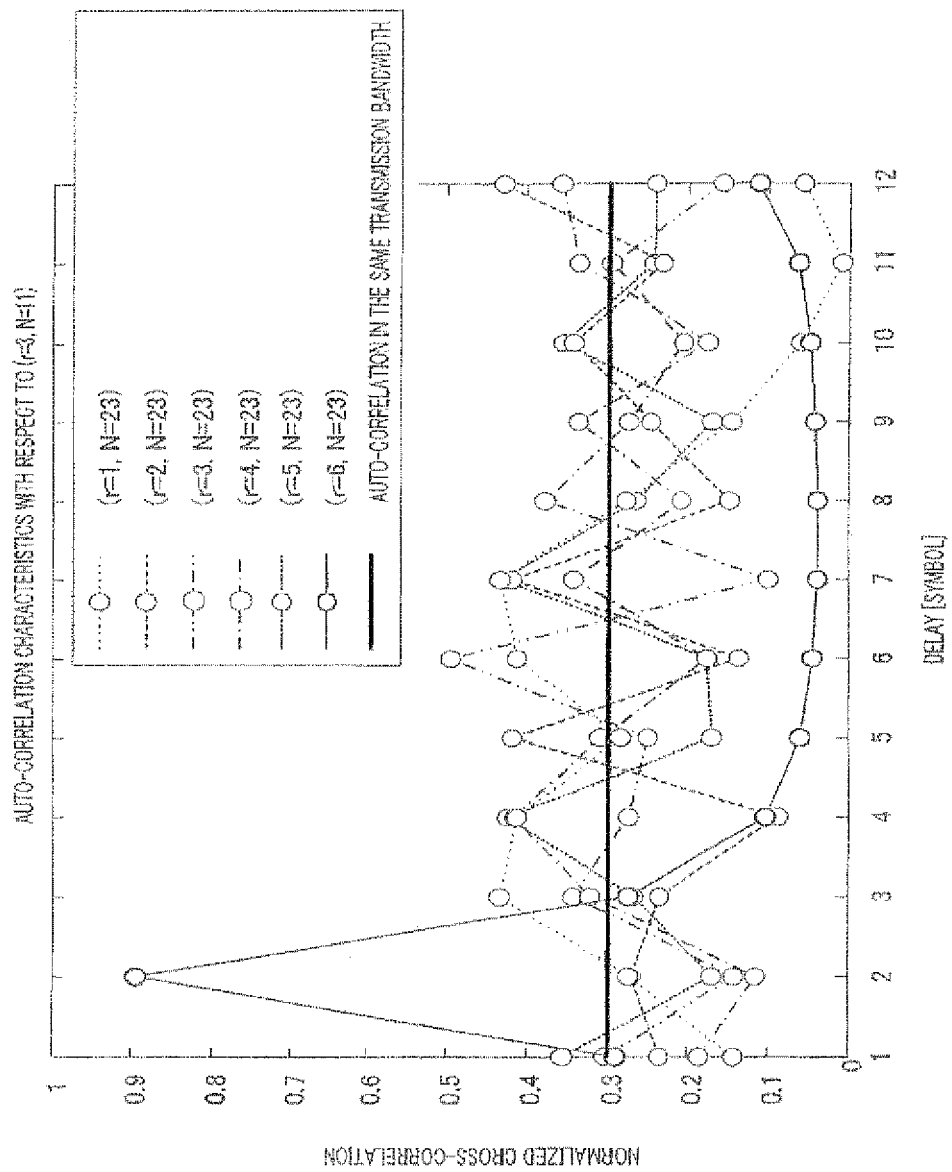
FIG. 1 shows auto-correlation characteristics when ZC sequences of different transmission bandwidths are multiplexed in the same frequency domain.
Figure 2:
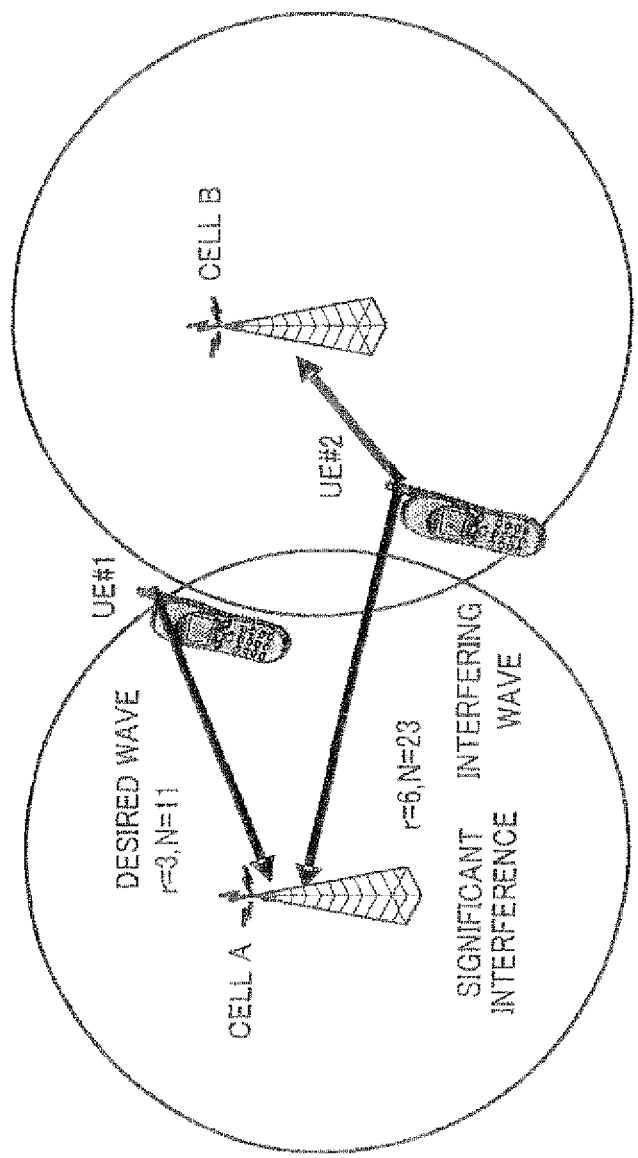
FIG. 2 shows interference from a ZC sequence of a different frequency bandwidth in another cell.
Figure 3:
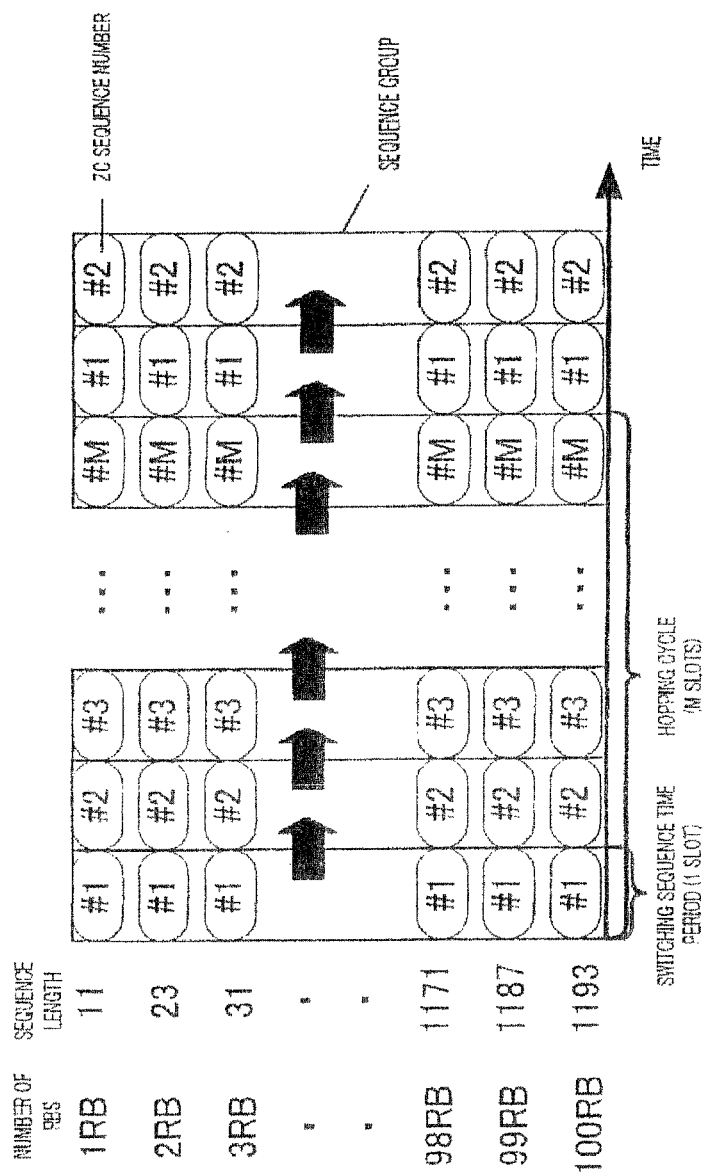
FIG. 3 shows an example of hopping ZC sequences disclosed in Non-Patent Document 1.
Figure 4:
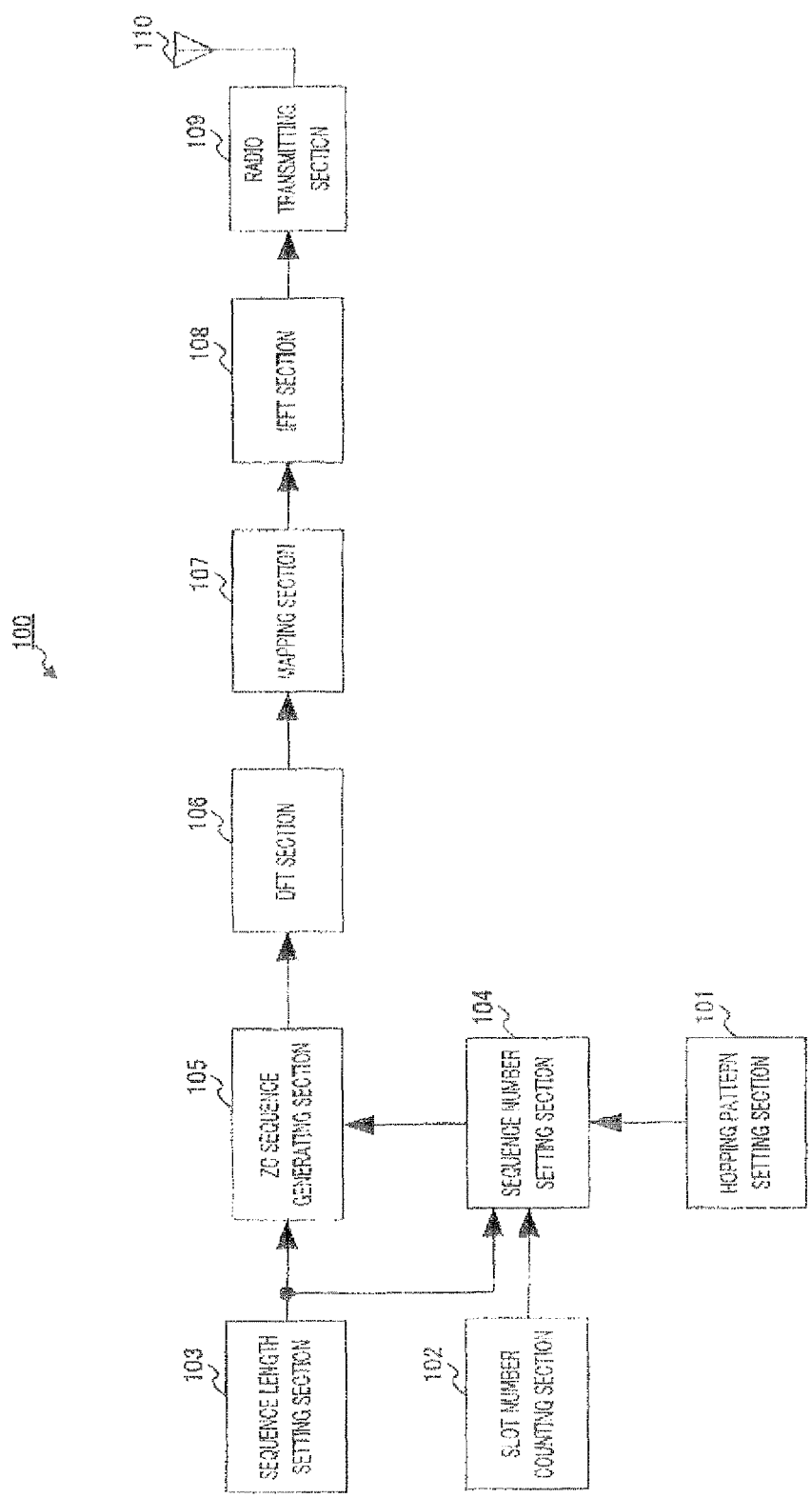
FIG. 4 is a block diagram showing the configuration of the mobile station according to Embodiment 1 of the present invention.

FIG. 4 is a block diagram showing the configuration of mobile station 100 according to Embodiment 1 of the present invention. Now, the components configuring mobile station 100 will be explained using FIG. 4.

Hopping pattern setting section 101 sets up a hopping pattern showing associations between a time period to switch a sequence on a per sequence length basis (here, the time period is managed by a slot numbers) and a ZC sequence number to be used as a DM-RS, in sequence number setting section 104. The hopping pattern is determined in the system in advance or signaled from the base station using, for example, a broadcast channel. The hopping pattern setting method will be described later.

Slot number counting section 102 counts the minimum time unit for switching a ZC sequence, that is, counts a slot number here, and sets up the counted slot number in sequence number setting section 104.

Sequence length setting section 103 sets up the sequence length of a ZC sequence in sequence number setting section 104 and ZC sequence generating section 105. A sequence length can be obtained uniquely from a piece of scheduling information signaled from the base station, a transmission bandwidth or the number of RBs.

From the slot number outputted from slot number counting section 102, the sequence length outputted from sequence length setting section 103 and the hopping pattern outputted from hopping pattern setting section 101, sequence number setting section 104 finds a ZC sequence number of the ZC sequence length to be used in the slot number, and sets up the ZC sequence number in ZC sequence generating section 105.

ZC sequence generating section 105 calculates equation 1 or 2 using the sequence length outputted from sequence length setting section 103 and the ZC sequence number outputted from sequence number setting section 104, to generate a ZC sequence, and outputs the generated ZC sequence to DFT section 106.

DFT section 106 performs a DFT (Discrete Fourier Transform) on the ZC sequence outputted from ZC sequence generating section 105, and outputs the ZC sequence after the DFT processing to mapping section 107.

Mapping section 107 maps the ZC sequence outputted from DFT section 106 to the transmission band of a DM-RS designated from the base station, and outputs the mapped ZC sequence to IFFT section 108.

IFFT section 108 performs an IFFT (Inverse Fast Fourier Transform) on the ZC sequence outputted from mapping section 107 and outputs the ZC sequence after the IFFT processing to radio transmitting section 109.

Radio transmitting section 109 performs transmitting processing, including D/A conversion, up-conversion and amplification, on the ZC sequence outputted from IFFT section 108, and transmits via radio the signal after the transmitting processing from antenna 110.

Figure 5:
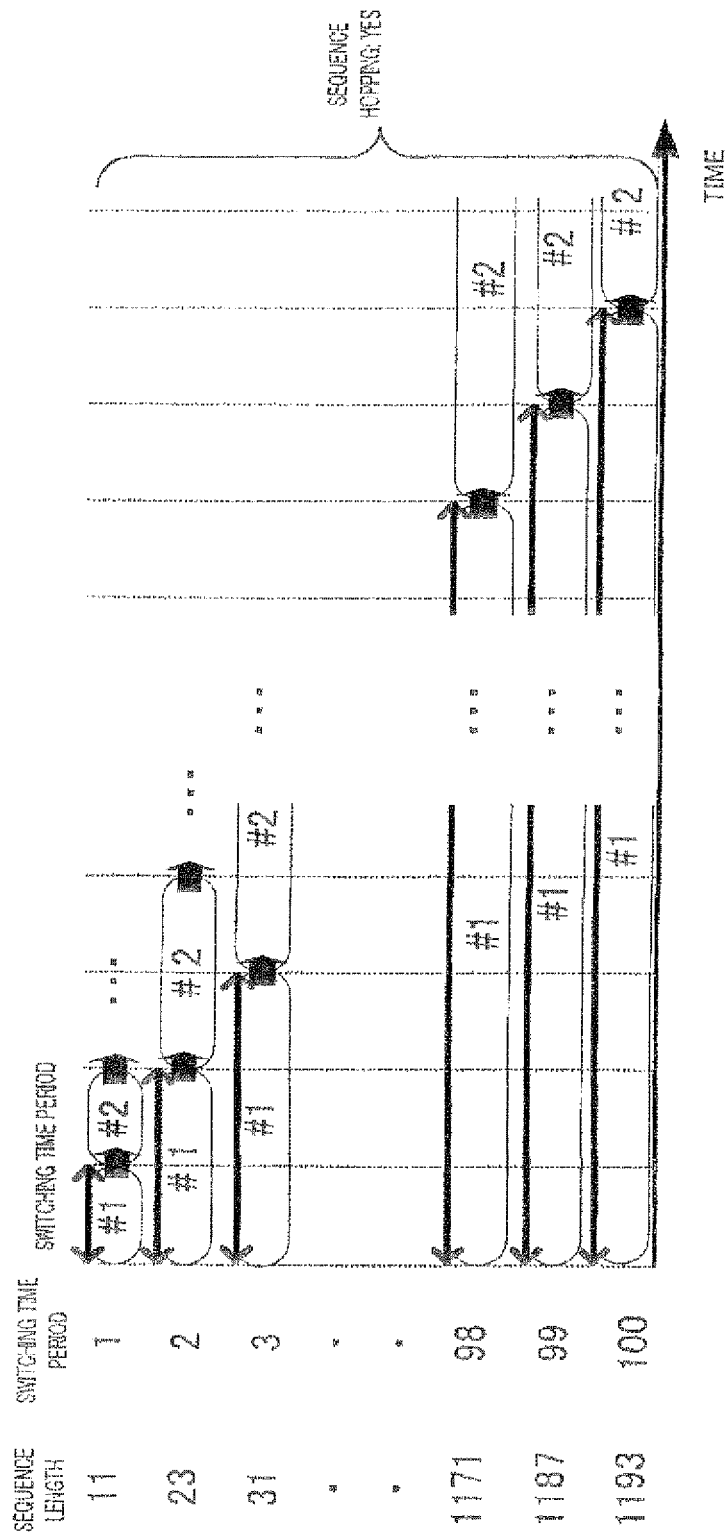
FIG. 5 shows a hopping pattern set in the hopping pattern setting section shown in FIG. 4.
Figure 6:
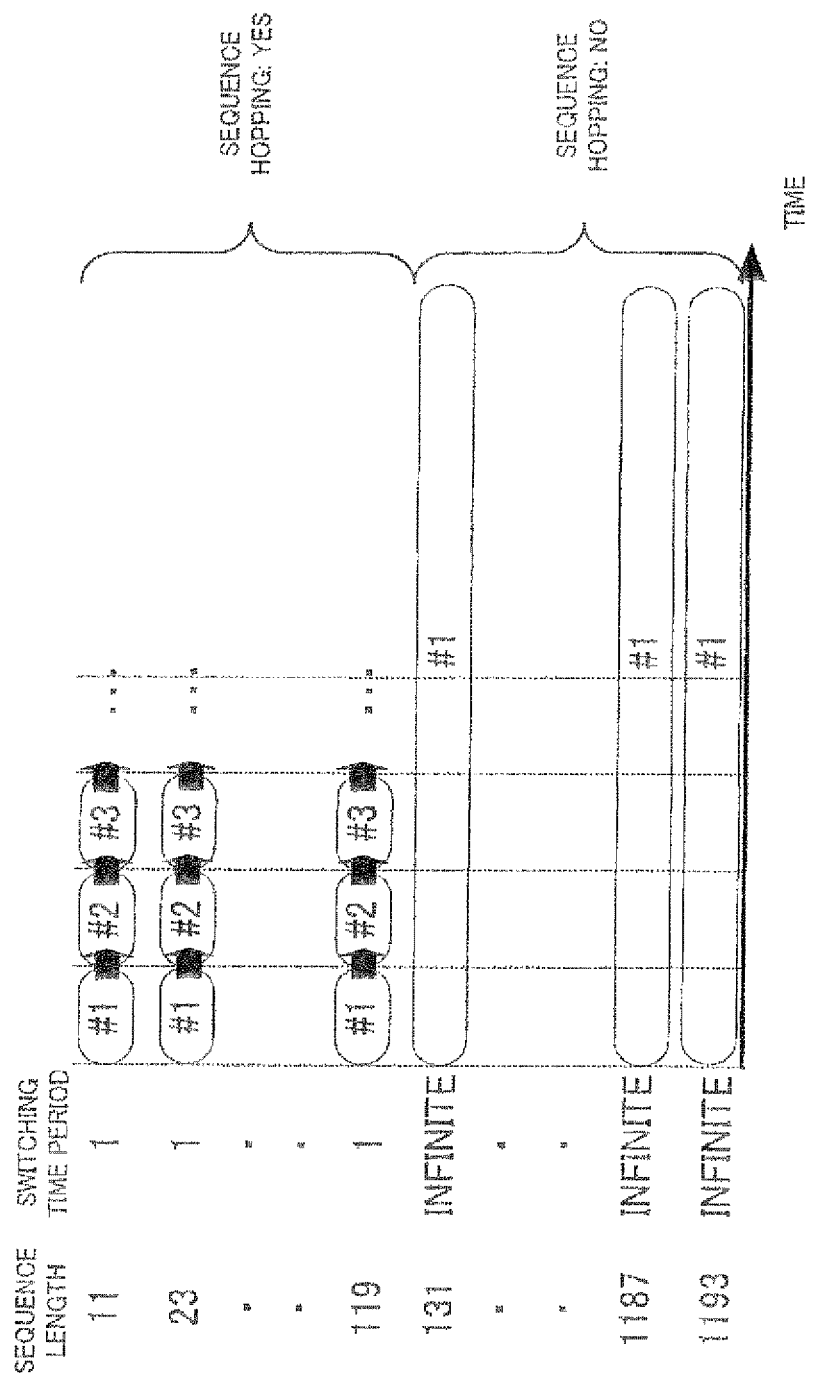
FIG. 6 shows another hopping pattern set in the hopping pattern setting section shown in FIG. 4.

Next, the hopping pattern set up in hopping pattern setting section 101 will be explained using FIGS. 5 and 6. FIGS. 5 and 6 show numbers of ZC sequences to be used as DM-RSs with time in each sequence length (i.e. each transmission bandwidth or each number of RBs), that is, show a hopping pattern.

In the hopping pattern shown in FIG. 5, the time intervals to switch ZC sequences are longer for longer sequence lengths (i.e. wider transmission bandwidths or a greater number of RBs). For example, the sequences are switched at one-slot time intervals in the transmission bandwidth in which the sequence length N is the shortest (N=11 and the number of RBs=1). Further, the sequences are switched at one-hundred-slot time intervals in the transmission bandwidth in which the sequence length N is the longest (N=1193 and the number of RBs=100).

In this way, by switching sequences at longer time intervals for longer sequences, mobile station 100 is able to reduce the amount of processing to generate new ZC sequences. By carrying out cell planning of ZC sequences whereby sequences of greater cross-correlations are not arranged in nearby cells, sequences of a longer sequence length make it possible to reduce the influence of interference caused between sequences of a longer sequence length. Many different ZC sequences can be generated from a ZC sequence of a longer sequence length, so that cell planning is easy.

Further, by switching sequences of a shorter sequence length at shorter time intervals, it is possible to acquire the effect of randomizing interference from other cells.

In this way, the reason for switching sequences of a shorter sequence length at shorter time intervals and for switching sequences of a longer sequence length at longer time intervals, is as follows. That is, a ZC sequence of a wide transmission bandwidth (a greater number of RBs or longer sequence length) as well as a short ZC sequence has an effect of randomizing interference from other cells.

First, a ZC sequence with a wider transmission bandwidth (a greater number of RBs or longer sequence length) has little influence of interference from other cells. There are three reasons for this. The first reason is that many different ZC sequences can be generated from a ZC sequence of a longer sequence length (N−1 ZC sequences can be generated from a ZC sequence of the sequence length N) so that, cell planning whereby sequences of greater cross-correlations are not arranged in nearby cells, is easy. The second reason is that a ZC sequence of a wider transmission bandwidth is very likely to be used in the center of a cell, and therefore interference level decreases by attenuation in distance. To transmit a signal of a wider transmission bandwidth, greater transmission power is required to fulfill desired received quality. Transmission power of a mobile station is limited, and therefore, a signal in a wider transmission bandwidth is difficult to be transmitted at a cell edge, in a cell with a longer cell radius. The third reason is that a ZC sequence of the longer sequence length N makes the process gain higher, and can reduce a ratio of a interference level to a signal level.

Further, as for interference caused between a ZC sequence of a narrow transmission bandwidth (a small number of RBs or short sequence length) and a ZC sequence of a wide transmission bandwidth, it is not necessary to hop both ZC sequences in the same way, and if only the short ZC sequence is hopped at short intervals, the combinations of ZC sequences to be multiplexed vary depending upon time, so that it is possible to acquire the effect of randomizing interference.

In the hopping pattern shown in FIG. 6, switching time interval is made different between groups in which a plurality of sequence lengths (transmission bandwidths or the numbers of RBs) are grouped. For example, assuming that one group is sequences of sequence lengths 11 to 119 (the number of RBs is between one and ten) and another group is sequences of sequence lengths 119 to 1193 (the number of RBs is between eleven and one hundred), and different switching time intervals are set up between the groups. The sequences are switched at one-slot time intervals in the group of short sequence lengths. Switching the sequences is not carried out in the group of long sequence lengths (i.e. switching time interval is infinite).

When the grouping method is defined in the system in advance, signaling from the base station to mobile station is not necessary. Further, when the base station actively changes groups using, for example, interference levels from other cells, the base station may need to signal a sequence length (transmission bandwidth or the number of RBs), which is a borderline to change groups, to mobile stations using broadcast channels and so on.

A specific grouping method includes grouping transmission bandwidths to which the same ZC sequence used in a plurality of sectors of the same base station are allocated, into one group. Studies are underway to increase the reuse factor of sequences by allocating the same ZC sequence with different amount of cyclic shift between sectors of the same base station, for transmission bandwidths in which sequence lengths are short and the number of ZC sequences that can be generated is small. In this way, the transmission bandwidths to which the same ZC sequence is allocated are subject to significant influence of interference because the number of sequences is small. Therefore, by setting up transmission bandwidths applied to this method as one group and by hopping all ZC sequences in the group at high speed, it is possible to acquire the effect of randomizing interference.

Further, another grouping method includes grouping transmission bandwidths of longer sequence lengths than the reuse factor of a ZC sequence that is required in the system, into one group. For example, when the reuse factor required in the system is 130, as shown in FIG. 6, one group is set up from transmission bandwidths of longer sequence length than 130, and all ZC sequences in the group are hopped at longer time intervals. In FIG. 6, the switching time interval of this group is infinite, that is, the sequences are not switched. Like this group, as for transmission bandwidths in which a sequence length is long and in which a large number of ZC sequences can be generated, cell planning whereby sequences of greater cross-correlations are not arranged in nearby cells becomes easy and influence of interference can decrease, and therefore, hopping ZC sequences at high speed is not necessary. Consequently, it is possible to reduce the amount of processing to generate new ZC sequences by the mobile station and the amount of memory of information about ZC sequences the mobile station has to hold.

In this way, according to Embodiment 1, by switching ZC sequences of a shorter sequence length at shorter time intervals and by switching ZC sequences of a longer sequence length at longer time intervals, it is possible to reduce the amount of processing and the amount of memory in the mobile station while maintaining the effect of randomizing interference from other cells.

Embodiment 2

Although a case has been explained with Embodiment 1 to change time intervals to switch ZC sequences according to transmission bandwidths (the number of RBs or sequence lengths), with Embodiment 2 of the present invention, a case is explained to change hopping cycles of ZC sequences according to transmission bandwidths (the number of RBs or sequence lengths). The "hopping cycle" refers to the time it takes a predetermined order of switching sequences to loop back. The configuration of the mobile station according to Embodiment 2 of the present invention is the same as the configuration according to Embodiment 1 shown in FIG. 4, and therefore overlapping description will be omitted.

Figure 7:
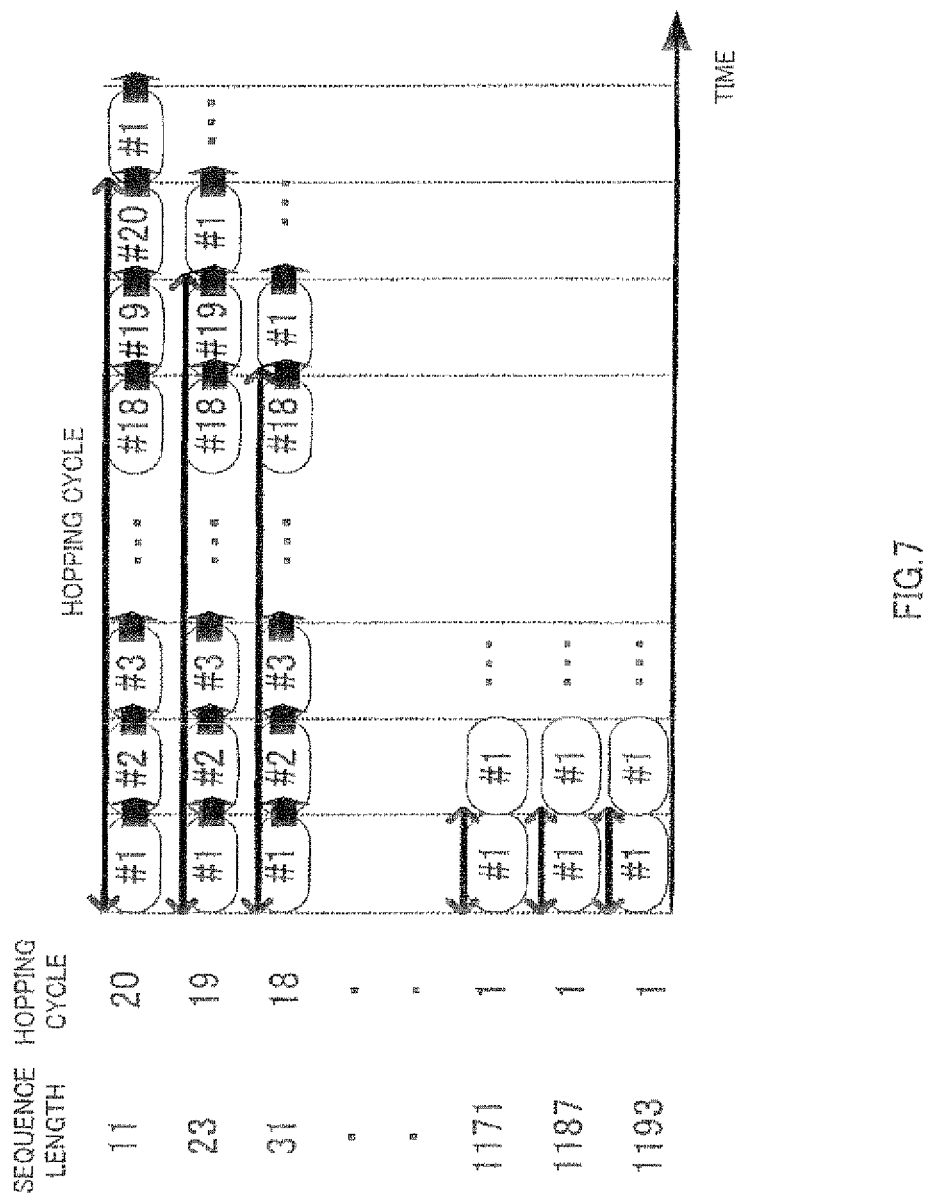
FIG. 7 shows a hopping pattern set in the hopping pattern setting section according to Embodiment 2 of the present invention.

FIG. 7 shows the hopping pattern set up in hopping pattern setting section 101 in the mobile station according to Embodiment 2 of the present invention. In the hopping pattern shown in this figure, the hopping cycle is shorter for longer sequence lengths (i.e. wider transmission bandwidths or a greater number of RBs) and the hopping cycle is longer for shorter sequence lengths (i.e. narrower transmission bandwidths or a smaller number of RBs). For example, if the time period to switch sequences is at the same one-slot intervals in all sequence lengths, the hopping cycle is 20 slots (i.e. twenty sequences are successively switched at one-slot intervals), for the transmission bandwidth in which the sequence length N is the shortest (N=11 and the number of RBs=1). The hopping cycle is shorter as 19 slots, for the transmission bandwidth in which sequence length N is the second shortest (N=23 and the number of RBs=2). By this means, it is possible to acquire the effect of randomizing interference for a shorter sequence length.

Further, for a plurality of transmission bandwidths where the number of RBs is twenty or more, the hopping cycle is one slot (a time interval to switch a sequence), that is, sequences are not switched. Consequently, ZC sequence information the mobile station has to hold decreases, and it is possible to reduce the amount of memory.

Figure 8:
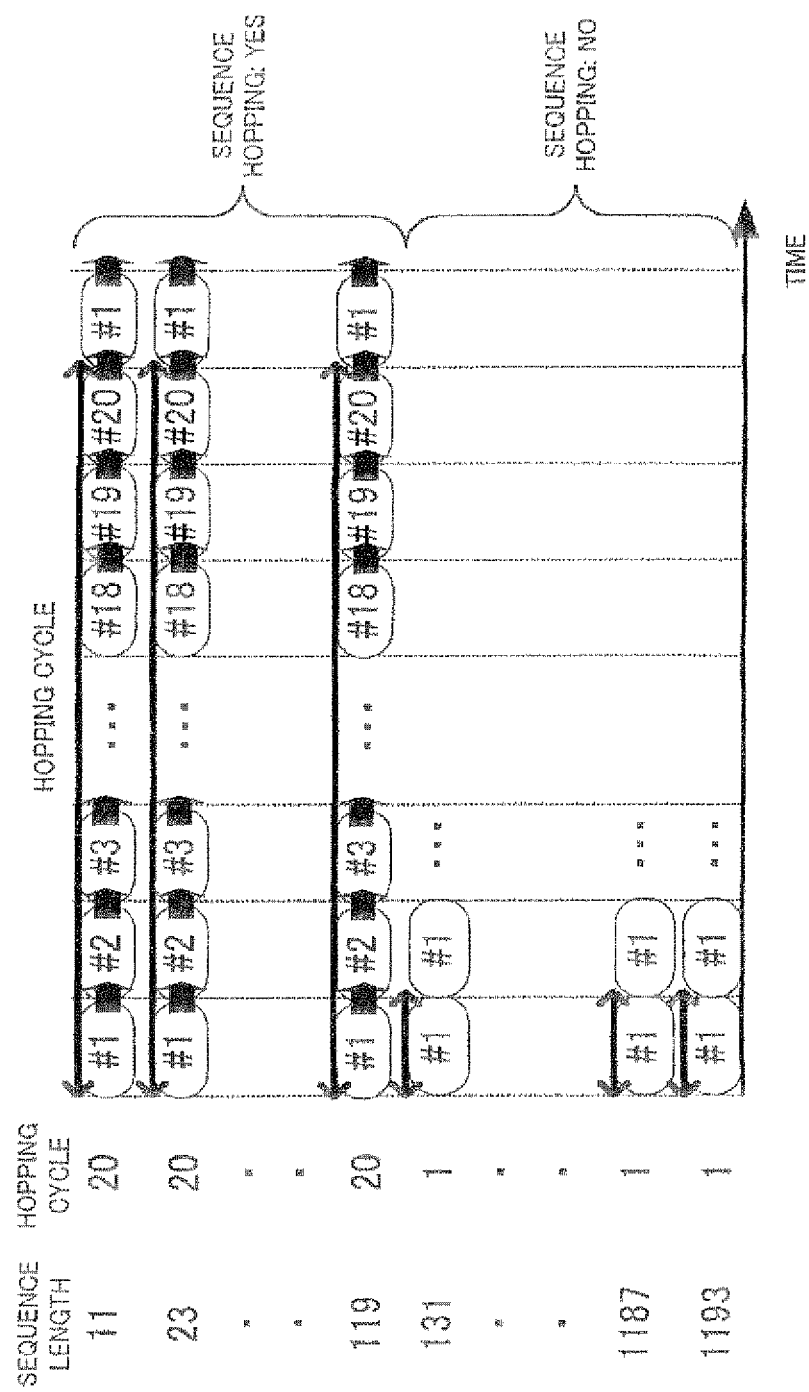
FIG. 8 shows another hopping pattern set in the hopping pattern setting section according to Embodiment 2 of the present invention.

As the hopping pattern shown in FIG. 8, different hopping cycles may be set up between groups in which a plurality of sequence lengths (a plurality of transmission bandwidths or a plurality of numbers of RBs) are grouped. In this figure, assuming that one group is sequence length N=11 to 119 and another group is sequence length N=131 to 1193, the hopping cycle in the former group is 20 slots and the hopping cycle in the latter group is one slot (without hopping).

In this way, according to Embodiment 2, by making hopping cycles longer for ZC sequences of a shorter sequence length and by making hopping cycles shorter for ZC sequences of a longer sequence length, it is possible to reduce the amount of memory in the mobile station while maintaining the effect of randomizing interference from other cells.

Although cases have been explained with the embodiments above as an example where the mobile station transmits reference signals to the base station, the base station may transmit reference signals to the mobile station.

Further, hopping of sequences may include switching a ZC sequence number (i.e. "r" in equations 1 and 2), but include switching the amount of cyclic shift. For example, sequences with numbers #1 and #2 in FIGS. 5 to 8 may be sequences in different amounts of shift in the same ZC sequence number r.

Further, although cases have been explained as an example with the above embodiments where a ZC sequence is used as a code sequence, similar to a ZC sequence, a GCL (Generalized Chirp Like) sequence ("c(k)" in the following sequence), which is a kind of CAZAC sequences, may be used, $c(k)=a(k)b(k \bmod m),$ $k=0,1,\ldots,N-1$ (Equation 3)

where N is the code length, and, $N=sm^2$ (s and m are integers) or $N=tm$ (t and m are integers). Moreover, a(k) is the ZC sequence in equation 1 or 2. Further, b(k) (k=0, . . . , m) represents the modulation sequence, which is the DFT (Discrete Fourier Transform) sequence of the following equation 4 or the Hadamard sequence of the following equation 5.

[4]

$$b_i(k) = W_m^{ik}, i, k = 0, 1, \ldots, m-1$$ (Equation 4)

[5]

$$b_i(k) = (-1)^{\sum_{j=0}^{m-1} i_j \cdot k_j}, i, k = 0, 1, \ldots, m-1$$ (Equation 5)

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-067004, filed on Mar. 15, 2007, including the specification, drawings and abstract, is incorporated herein by reference in its entirety.

INDUSTRIAL APPLICABILITY

The radio transmitting apparatus and radio transmission method according to the present invention can reduce the amount of processing or the amount of memory while maintaining the effect of randomizing interference from other cells, and are applicable to, for example, mobile communication systems.

The invention claimed is:

1. A radio transmission apparatus comprising:
circuitry operative to generate a code sequence; and
a transmitter operative to transmit the generated code sequence,
wherein said circuitry operative to:
make a comparison between a sequence length of a reference signal and a determined value comprising one of a transmission bandwidth and a number of resource blocks;
set a sequence hopping pattern determining an index of sequence, which is used in each slot of slots for generating the code sequence used as the reference signal, to a first hopping pattern, in which the index of sequence is changed between the slots, when the sequence length is shorter than the determined value based on the comparison; and
set the sequence hopping pattern to a second hopping pattern, in which the index of sequence is not changed between the slots, when the sequence length is longer or equal to the determined value based on the comparison; and generate the code sequence based on the index of sequence, which is determined by the set sequence hopping pattern.

2. The radio transmission apparatus according to claim 1, wherein the circuitry is operative to set the sequence hopping pattern to the first hopping pattern when the sequence length is shorter than the determined value and set the sequence hopping pattern to the second hopping pattern when the sequence length is longer or equal to the determined value.

3. The radio transmission apparatus according to claim 1, wherein the sequence length is defined by the number of resource blocks.

4. The radio transmission apparatus according to claim 1, wherein the code sequence comprises a Zadoff-Chu sequence.

5. The radio transmission apparatus according to claim 1, wherein the code sequence comprises a generalized chirp like sequence.

6. The radio transmission apparatus according to claim 1, wherein a plurality of sequence lengths of the reference signal are divided into groups, which include a first group for first sequence lengths and a second group for second sequence lengths that are longer than the first sequence lengths, and the sequence hopping pattern set for the first group is different from the sequence hopping pattern set for the second group.

7. The radio transmission apparatus according to claim 1, wherein the code sequence is generated based on a Zadoff-Chu sequence $a_r(k)$ with the index of sequence r according to an equation 1;

$$a_r(k) = \begin{cases} e^{-j\frac{2\pi r}{N}(k^2/2+qk)}, & N : \text{even} \\ e^{-j\frac{2\pi r}{N}(k(k+1)/2+qk)}, & N : \text{odd} \end{cases} \quad \text{(Equation 1)}$$

where N is a sequence length of the Zadoff-Chu sequence, k is an integer from 0 to N−1 and q is an arbitrary integer.

8. A radio transmission method performed by a radio transmission apparatus, the radio transmission method comprising:

making a comparison between a sequence length of a reference signal and a determined value comprising one of a transmission bandwidth and a number of resource blocks;

setting a sequence hopping pattern determining an index of sequence, which is used in each slot of slots for generating a code sequence used as the reference signal, to a first hopping pattern, in which the index of sequence is changed between the slots, when the sequence length is shorter than the determined value based on the comparison;

setting the sequence hopping pattern to a second hopping pattern, in which the index of sequence is not changed between the slots, when the sequence length is longer or equal to the determined value based on the comparison;

generating the code sequence based on the index of sequence determined by the set sequence hopping pattern; and transmitting the generated code sequence.

9. The radio transmission method according to claim 8, wherein the sequence hopping pattern is set to the first hopping pattern when the sequence length is shorter than the determined value and is set to the second hopping pattern when the sequence length is longer or equal to the determined value.

10. The radio transmission method according to claim 8, wherein a plurality of transmission bandwidths of the reference signal are divided into groups, which include a first group for first sequence lengths and a second group for second sequence lengths that are longer than the first sequence lengths, and the sequence hopping pattern set for the first group is different from the sequence hopping pattern set for the second group.

11. The radio transmission method according to claim 8, wherein the code sequence is generated based on a Zadoff-Chu sequence $a_r(k)$ with the index of sequence r according to an equation 1;

$$a_r(k) = \begin{cases} e^{-j\frac{2\pi r}{N}(k^2/2+qk)}, & N : \text{even} \\ e^{-j\frac{2\pi r}{N}(k(k+1)/2+qk)}, & N : \text{odd} \end{cases} \quad \text{(Equation 1)}$$

where N is a sequence length of the Zadoff-Chu sequence, k is an integer from 0 to N−1 and q is an arbitrary integer.

* * * * *